US012749997B2

(12) United States Patent
Kuehner

(10) Patent No.: US 12,749,997 B2
(45) Date of Patent: Sep. 29, 2026

(54) METHOD AND DEVICE FOR OPERATING AN INVERTER

(71) Applicant: Robert Bosch GmbH, Stuttgart (DE)

(72) Inventor: Jochen Kuehner, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 211 days.

(21) Appl. No.: 18/718,958

(22) PCT Filed: Oct. 24, 2022

(86) PCT No.: PCT/EP2022/079566
§ 371 (c)(1),
(2) Date: Jun. 12, 2024

(87) PCT Pub. No.: WO2023/110200
PCT Pub. Date: Jun. 22, 2023

(65) Prior Publication Data

US 2024/0421742 A1 Dec. 19, 2024

(30) Foreign Application Priority Data

Dec. 13, 2021 (DE) ..................... 10 2021 214 224.9

(51) Int. Cl.
*H02P 21/00* (2016.01)
*H02P 27/06* (2006.01)
*H02P 29/02* (2016.01)

(52) U.S. Cl.
CPC .............. *H02P 27/06* (2013.01); *H02P 29/02* (2013.01)

(58) Field of Classification Search
CPC .......... H02P 27/06; H02P 29/02; H02P 21/00; H02K 3/28
See application file for complete search history.

(56) References Cited

U.S. PATENT DOCUMENTS

2014/0375238 A1* 12/2014 Kurfiss .................. H02H 9/045 318/400.22
2020/0373870 A1* 11/2020 Ramesh Chandran ...................... H02P 21/00
2021/0075286 A1* 3/2021 Graßl ....................... H02K 3/28

FOREIGN PATENT DOCUMENTS

DE 102011081173 A1 2/2013
DE 102012101508 A1 * 8/2013 .......... H02P 29/0241
DE 112015000834 T5 11/2016
DE 112015000835 T5 11/2016
(Continued)

OTHER PUBLICATIONS

Translation of International Search Report for Application No. PCT/EP2022/079566 dated Feb. 16, 2023 (3 pages).

*Primary Examiner* — Cortez M Cook
(74) *Attorney, Agent, or Firm* — Michael Best & Friedrich LLP

(57) ABSTRACT

The invention relates to a method (400) for operating an inverter (110), comprising the steps of: —controlling (450) the inverter (110) for transferring the inverter (110), the intermediate circuit capacitor (140) and the electric machine (190) into a safe state, in particular into a free-wheeling mode (FW). The method is characterized by the following steps: determining (460) a cut-off vector; controlling (470) the inverter (110) corresponding to the cut-off vector; determining (480) the three phase currents (Iu, Iv, Iw) of the electric machine (190); controlling (490) the inverter (110) into the free-wheeling mode (FW) if the three phase currents (Iu, Iv, Iw) determined fall below a predefined current threshold value (Is).

11 Claims, 6 Drawing Sheets

(56) References Cited

FOREIGN PATENT DOCUMENTS

| | | | |
|---|---|---|---|
| DE | 112015004320 | T5 | 7/2017 |
| DE | 112015004786 | T5 | 8/2017 |
| DE | 102016223539 | A1 | 5/2018 |

* cited by examiner

METHOD AND DEVICE FOR OPERATING AN INVERTER

BACKGROUND

The invention relates to a method and a device for operating an inverter. Furthermore, the invention relates to a drive train with a corresponding device and a vehicle with a drive train as well as a computer program and a computer-readable storage medium.

Electric drives of hybrid or electric vehicles comprise an electric machine, such as a permanently actuated synchronous machine or an asynchronous machine. The electric machine of such a drive system can be supplied with an AC voltage by means of a pulse inverter. In the event of a fault condition (defect in the computing unit, defect in the CAN bus, defect in the hardware) in the drive system, it may be necessary to set a safe state in the inverter. Such a safe state can comprise, for example, an active short circuit in which the individual phases of the electric machine are short-circuited via the inverter. Another safe state is, for example, free-wheeling. In this case, all switch elements of the inverter are open. A current flow is only possible via the free-wheeling diodes, which are provided in parallel with the switch elements of the inverter.

The publication DE 10 2011 081 173 A1 discloses an operating state circuit for an inverter and a method for setting the operating states of an inverter. In particular, depending on a determined rotational speed of an electric machine, it is intended to switch either to a free-wheeling state or an active short circuit.

The change from regular operation to active short circuit results in very high currents that far exceed the normal load currents through the switch elements of the inverter. Accordingly, the switch elements used for this transition are dimensioned larger in terms of current carrying capacity than would actually be necessary for regular operation. In free-wheeling mode, on the other hand, the voltage induced in the electric machine increases as the rotational speed of the electric machine increases. Accordingly, the switch elements used are dimensioned larger for this operating state in terms of dielectric strength than would actually be necessary for regular operation. The higher currents and voltages also lead to a greater load on an intermediate circuit capacitor arranged on the input side of an inverter. This is also dimensioned larger than would be necessary for regular operation in accordance with the special load for these transitions between regular operation and the safe states. The larger dimensions mean that more space and material is required for the switch elements and the intermediate circuit capacitor. This contradicts the goal of developing small, compact power electronics. There is therefore a need for solutions that can minimize larger dimensions.

SUMMARY

A method for operating an inverter is provided. The inverter is connected on the input side to an intermediate circuit capacitor and on the output side to an electrically energized three-phase machine. The electric machine is operated in a first operating mode, in particular in generator mode, or in a second operating mode, in particular in motor mode. The method comprises the steps of: controlling the inverter for transferring the inverter, the intermediate circuit capacitor and the electric machine into a safe state, in particular into a free-wheeling mode. The method is characterized in that the controlling of the inverter for transferring into a safe state is performed by means of a first sequence of steps, wherein the first sequence of steps comprises the steps of: determining a cut-off vector; controlling the inverter corresponding to the cut-off vector; determining the three phase currents of the electric machine; controlling the inverter into the free-wheeling mode if the determined three phase currents fall below a predefinable current threshold value.

The electrically energized machine is operated regularly or in normal operation in a first or second operating mode. Preferably, these operating modes are either a generator-based or motor-based operation of the electric machine. Preferably, the inverter is controlled by means of space vector pulse width modulation or block operation. A method is provided for transferring the inverter, the intermediate circuit capacitor and the electric machine into a safe state, in which a first sequence of steps is carried out. After determining a cut-off vector, the inverter is controlled with the cut-off vector until the determined phase currents, preferably their magnitude, each fall below a predefinable current threshold value. The inverter is then permanently switched to free-wheeling. Preferably, all switch elements of the inverter are opened for this purpose. A cut-off vector is one of several possible voltage or current vectors in which only one switch element on one half-bridge or one switch element on each of two half-bridges is closed and all remaining switch elements of the three half-bridges of the inverter are open. Preferably, different methods are available for determining the cut-off vector. Advantageously, a method is provided with which a transition into a safe state is made possible, in which no substantially excessive current or voltage increases result compared to the regular operation of an electrically energized machine.

In another configuration of the invention, determining the cut-off vector comprises the following steps: controlling the inverter into the free-wheeling mode; determining a voltage vector in free-wheeling mode; determining the cut-off vector depending on the voltage vector. The inverter is thus first activated in free-wheeling mode. For this purpose, all switch elements of the half-bridges of the inverter are opened. The voltage vector is preferably determined from a determination of the phase voltages during free-wheeling mode. Preferably, the DC voltage is determined on the input side of the inverter. Preferably, the phase voltages of the three phases are determined or measured on the output side and stored in digital form. Preferably, the value 1 for a phase voltage is stored for each phase if the phase voltage is greater than half the DC voltage determined and the value 0 for a phase voltage is stored if the phase voltage is less than half the DC voltage determined. Preferably, the voltage vector is derived from the values determined for each phase. Alternatively, the voltage vector is received directly from the control of the inverter, which is already available due to the control. A cut-off vector is one of several possible voltage or current vectors in which only one switch element on one half-bridge or one switch element on each of two half-bridges is closed and all remaining switch elements of the three half-bridges of the inverter are open. Preferably, different methods are available for determining the cut-off vector. The cut-off vector is preferably determined from the voltage vector in free-wheeling mode. Preferably, the cut-off vector is determined from a characteristic map depending on the voltage vector. In the characteristic map, effective cut-off vectors are assigned to possible voltage vectors. Preferably, the effective cut-off vectors are determined by means of a simulation or from measurements and stored in the characteristic map. Preferably, an electrical period, preferably between 0 and 360°, of the phase currents is divided into 6 time intervals, preferably time intervals of equal length. A switch-off vector is preferably assigned to each time interval. Preferably, the determined voltage vector is used to determine which time interval the control of the inverter is currently in. Preferably, the corresponding cut-off vector is taken from the characteristic map depending on the time interval. Advantageously, options for determining the cut-off vector are provided.

In another configuration of the invention, determining the cut-off vector comprises the following steps: regularly updating the cut-off vector in a memory depending on the operation of the inverter; reading the cut-off vector from the memory.

Preferably, cut-off vectors are determined by means of a simulation or from measurements and stored in a characteristic map. Preferably, an electrical period, preferably between 0 and 360°, of the phase currents is divided into 6 time intervals, preferably time intervals of equal length. Preferably, a cut-off vector is assigned to each time interval. Preferably, the time interval in which the inverter is currently being controlled is known to a control system based on the operation of the inverter. Preferably, the corresponding cut-off vector is taken from the characteristic map depending on the time interval. Preferably, the cut-off vector is regularly updated in a memory by always writing the current cut-off vector to the memory and overwriting the previous cut-off vector. Preferably, the memory is a hardware memory and is assigned to the half-bridges, preferably assigned to the output stage of the switch elements of the half-bridges, and independent of controlling the inverter. Consequently, the current cut-off vector is determined by reading the cut-off vector from the memory. Preferably, the cut-off vector is thus constantly updated and written to the memory while the inverter is being controlled or operated. Preferably, in the event of a fault, this cut-off vector is read from the memory and set directly at the half-bridges, preferably at the output stage of the switch elements of the half-bridges.

The storage is preferably carried out so that the procedure for operating an inverter is carried out safely even in the event of a failure of a device or a computer, which preferably controls the operation of the inverter. Advantageously, an alternative method for determining the cut-off vector is provided.

In another configuration of the invention, the inverter comprises a first, second and third half-bridge connected in parallel with the intermediate circuit capacitor, wherein each half-bridge comprises two switch elements connected in series and a center tap between each of the two switch elements connected in series is connected to a respective phase connection of the electric machine, wherein the cut-off vector determined describes a closing of a first switch element of the first half-bridge and an opening of a second switch element of the first half-bridge and an opening of the two switch elements of the second and the third half-bridge or the cut-off vector determined describes a closing of a first switch element of the first half-bridge and an opening of a second switch element of the first half-bridge and a closing of a first switch element of the second half-bridge and an opening of a second switch element of the second half-bridge and the opening of the two switch elements of the third half-bridge. Preferably, a cut-off vector is one of several possible voltage or current vectors in which only one switch element on one half-bridge or one switch element on each of two half-bridges is closed and all remaining switch elements of the three half-bridges of the inverter are open. For this purpose, a cut-off vector is determined which only describes or specifies the closing of one switch element of a half-bridge, wherein all other switch elements of the half-bridges remain open. Alternatively, a cut-off vector is determined which only describes or specifies the closing of a switch element of a first half-bridge and the closing of a switch element of a second half-bridge, wherein all other switch elements of the half-bridges remain open. Advantageously, possible cut-off vectors are provided, by means of which a transition from regular operation into a safe state is made possible, in which no substantially excessive current or voltage increases result compared to the regular operation of an electrically energized machine.

In another configuration of the invention, controlling the inverter for transferring by means of a first sequence of steps comprises the step of: Minimizing or switching off the excitation current of the electric machine.

If the excitation current or excitation voltage of an electrically energized electric machine is minimized or switched off, no or only a minimal voltage is induced even if the rotor of the electric machine is rotating at high speed. Advantageously, a method is provided which makes it possible to use a free-wheeling state as a safe state of an electrically energized machine even at high rotational speeds of the electric machine.

In another configuration of the invention, the method begins with the steps of: determining the operating mode of the electric machine, controlling the inverter for transferring depending on the determined operating mode by means of the first sequence of steps when the first operating mode is present and by means of a second sequence of steps when the second operating mode is present. The operating mode is available to an inverter controller as information. Preferably, the method receives this information from the inverter controller. Preferably, the information as to which operating mode is present is detected by means of a current sensor in the DC voltage section of the inverter. For example, depending on the sign of the detected current, it is possible to detect whether a generator-based or motor-based operating mode is present. Depending on the operating mode present, controlling of the inverter for transfer is carried out using the first or a second sequence of steps. Advantageously, a method is provided for bringing the inverter, the DC link capacitor and the electrically energized machine into a safe state by means of different methods.

In another configuration of the invention, the second sequence of steps comprises the steps: controlling the inverter into free-wheeling mode; determining a voltage vector in free-wheeling mode; determining a negative vector depending on the voltage vector; determining an input-side DC voltage of the inverter; controlling the inverter corresponding to the negative vector if the determined DC voltage exceeds a predefinable voltage threshold; controlling the inverter into free-wheeling mode as long as the determined DC voltage falls below the predefinable voltage threshold.

A further method is provided for transferring the inverter, the intermediate circuit capacitor and the electric machine into a safe state, in which a first sequence of steps is carried out. To do this, the inverter is first switched to free-wheeling mode. For this purpose, all switch elements of the half-bridges of the inverter are opened. The voltage vector is preferably determined from a determination of the phase voltages during free-wheeling mode. The DC voltage is preferably determined on the input side of the inverter. Preferably, the phase voltages of the three phases are determined or measured on the output side and stored in digital form. Preferably, the value 1 for a phase voltage is stored for each phase if the phase voltage is greater than half the DC voltage determined and the value 0 for a phase voltage is stored if the phase voltage is less than half the DC voltage determined. Preferably, the voltage vector is derived from the values determined for each phase. Alternatively, the voltage vector is received directly from the control of the inverter, which is already available due to the control. A negative vector is one of the eight possible voltage vectors that are used in space vector pulse width modulation to control the switch elements of the inverter. Preferably, different methods are possible for determining the negative vector. The negative vector is preferably determined from the voltage vector in free-wheeling mode. Preferably, the negative vector is determined from the voltage vector at the time in free-wheeling mode at which the determined DC voltage exceeds a predefinable voltage threshold value. Preferably, the values of the negative vector determined are inverted with respect to the voltage vector, wherein a 1 means that an upper switch element is closed and a 0 means that the upper switch element is opened. The lower switch elements are each controlled in a complementary manner. This means that when the upper switch element is closed, the lower one is open and vice versa. Alternatively, the negative vector is preferably determined depending on the voltage vector from a characteristic map. In the characteristic map, effective negative vectors are assigned to possible current vectors or voltage vectors. The effective negative vectors are preferably determined empirically. The DC voltage on the input side of the inverter is preferably determined in the DC intermediate circuit, preferably at the intermediate circuit capacitor, preferably with a voltage measuring device. The inverter is controlled with the negative vector if the DC voltage determined exceeds a predefinable voltage threshold value. If the DC voltage determined falls below the voltage threshold value, the inverter is switched to free-wheeling mode. Advantageously, possibilities for determining a negative vector are provided, and a method for enabling a transition into a safe state in which no substantially excessive current or voltage results compared to regular operation of an electrically energized machine.

Furthermore, the invention relates to a device for operating an inverter, wherein the inverter is configured to be connected on the input side to an intermediate circuit capacitor and on the output side to an electrically energized three-phase machine. The electric machine is configured to be operated in a first operating mode, in particular in a generator-based mode, or in a second operating mode, in particular in a motor-based mode. The device is configured to control the inverter for transferring the inverter, the intermediate circuit capacitor and the electric machine into a safe state, in particular into free-wheeling mode. The device is characterized in that the device is configured to perform controlling of the inverter for transfer by means of a first sequence of steps, wherein the first sequence of steps comprises: Determine a cut-off vector, control the inverter corresponding to the cut-off vector, determine three phase currents of the electric machine and control the inverter in free-wheeling mode if the determined three phase currents fall below a predefinable current threshold value.

The electrically energized machine is operated regularly or in normal operation in a first or second operating mode. Preferably, these operating modes are either a generator-based or motor-based operation of the electric machine. Preferably, the inverter is controlled by means of space vector pulse width modulation or block operation. A device is provided which is configured to transfer an inverter, a connected intermediate circuit capacitor and an electric machine into a safe state. A first sequence of steps is performed for this purpose. After determining a cut-off vector, the device controls the inverter with the cut-off vector until the determined phase currents, preferably their magnitude, each fall below a predefinable current threshold value. The device then controls or switches the inverter permanently to free-wheeling. Preferably, all switch elements of the inverter are opened for this purpose. Preferably, a cut-off vector is one of several possible voltage or current vectors in which only one switch element on one half-bridge or one switch element on each of two half-bridges is closed and all remaining switch elements of the three half-bridges of the inverter are open. Preferably, different methods are available for determining the cut-off vector. Advantageously, a device is provided with which a transition into a safe state is made possible, in which no substantially excessive current or voltage increases result compared to the regular operation of an electrically energized machine.

Furthermore, the invention relates to a drive train with a described device and preferably with an inverter, an intermediate circuit capacitor and/or an electrically energized machine. Such a drive train is, e.g., used to drive an electrical vehicle. The method and the device enable the drive train to transition into a safe state.

The invention further relates to a vehicle having a drive train, as described. Advantageously, a vehicle is thus provided which comprises a device with which the power electronics of the vehicle can be transferred into a safe state.

The invention further relates to a computer program comprising commands which cause the described device to perform the described method.

The invention further relates to a computer-readable storage medium comprising commands which, when executed by a described device, cause the described device to perform the described method steps. Preferably, the computer-readable storage medium is implemented within an ASIC or a programmable logic device (CPLD, FPGA . . . ).

Further features and advantages of embodiments of the invention are apparent from the following description with reference to the accompanying drawings.

BRIEF DESCRIPTION OF THE DRAWINGS

The invention will be explained in further detail hereinafter with reference to the drawings.

DETAILED DESCRIPTION

Figure 1:
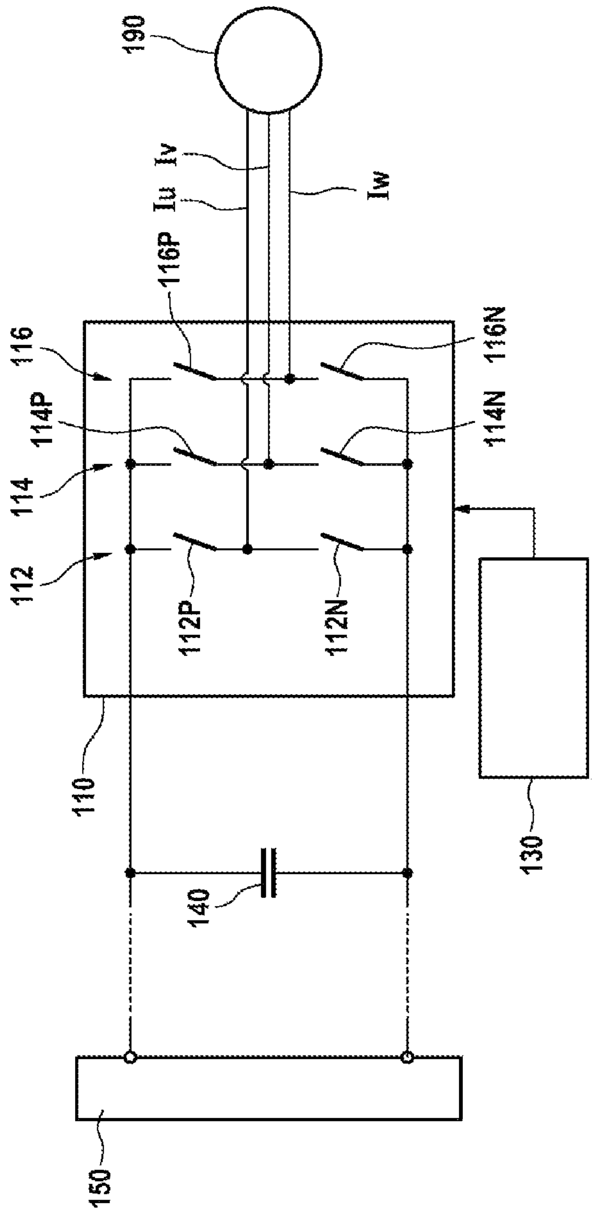
FIG. 1 a schematic illustration of a device for operating an inverter.

FIG. 1 shows an inverter 110 that is electrically connected on the input side to an intermediate circuit capacitor 140. Preferably, the intermediate circuit capacitor is a film capacitor or an electrolytic capacitor. On the output side, the inverter 110 is electrically connected via three phases to an electrically energized three-phase machine 190. A battery 150 can be electrically connected to the intermediate circuit capacitor 140 via connection lines (shown dashed). A DC voltage Udc is applied to the input side of the inverter 110 and/or the intermediate circuit capacitor 140. The inverter 110 comprises three half-bridges 112, 114, 116. The half-bridges 112, 114, 116 each comprise a series circuit of two switch elements 112P, 112N, 114P, 114N, 116P, 116N. A center tap is arranged between each of the two switch elements, each of which is connected to one of the three phases of the electric machine. By means of the three half-bridges 112, 114, 116, the positive potential of the DC voltage Udc can be connected to a phase of the electric machine 190 by closing an upper switch 112P, 114P, 116P of the half-bridge, or the negative potential of the DC voltage Udc can be connected to a phase of the electric machine 190 by closing a lower switch 112N, 114N, 116N. The switch elements 112P, 112N, 114P, 114N, 116P, 116N are preferably power semiconductor switch elements, such as IGBTs, MOSFETs or SiC semiconductors. On the output side, the currents lu, Iv, Iw flow through the phases of the electric machine 190 during operation of the inverter 110 and the electric machine 190. FIG. 1 shows a device 130 for controlling the inverter 110. The device 130 is configured to control the inverter 110 for transferring the inverter, the intermediate circuit capacitor 140 and the electric machine 190 into a safe state, in particular to a free-wheeling mode. The device 130 is configured to perform the controlling of the inverter 110 for transferring by means of a first sequence of steps, wherein the first sequence of steps comprises: determining a cut-off vector VA, controlling the inverter 110 corresponding to the cut-off vector VA, determining three phase currents lu, Iv, Iw of the electric machine and controlling the inverter into free-wheeling mode (FW) if the determined three phase currents lu, Iv, Iw fall below a predefinable current threshold value Is.

Figure 2:
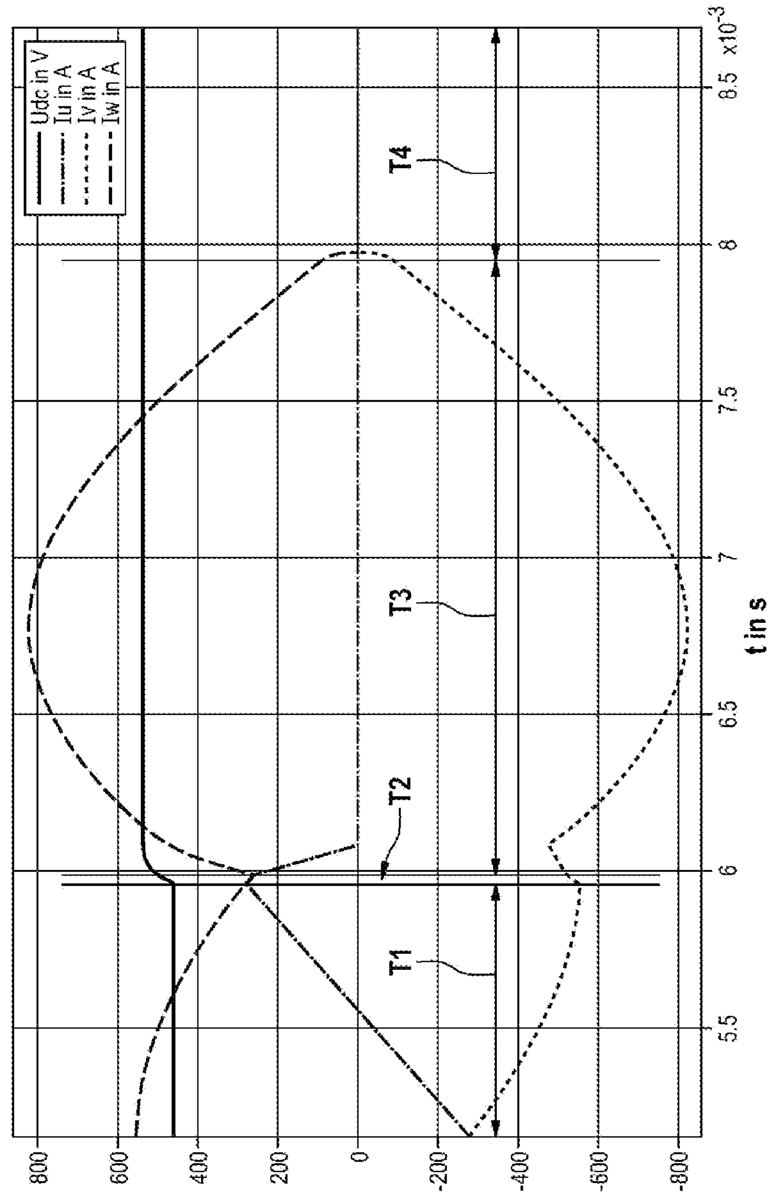
FIG. 2 a first schematic diagram of DC voltage and phase current

FIG. 2 shows a first schematic DC voltage, phase current diagram over time, which shows the curves of the DC voltage Udc at the intermediate circuit capacitor 140 and the phase currents lu, Iv, Iw on the output side of the inverter in the phases of the electrically energized machine if the inverter 110 is controlled by a device 130 for transferring the inverter 110, the intermediate circuit capacitor 140 and the electric machine 190 into a safe state by means of a first sequence of steps. During a first time interval T1 shown, the electric machine is operated in a first operating mode B1. In this operating mode B1, a constant DC voltage Udc is applied to the intermediate circuit capacitor 140. Sinusoidal phase currents lu, Iv, Iw, offset by 120°, flow through the phases of the electric machine. According to the exemplary illustration, the inverter 140 is briefly switched to free-wheeling FW in a second illustrated time interval T2 to determine the cut-off vector VA. The DC voltage Udc at the intermediate circuit capacitor increases rapidly during this time. After determining a cut-off vector VA, the inverter is controlled in a third time interval T3 corresponding to the cut-off vector VA. The phase current lu through the half-bridge, at which a switch was closed, immediately drops to 0 A. The remaining phase currents Iv, Iw increase slightly before they drop together. Phase currents are determined by means of a phase current measuring unit. If the phase currents fall below a predefinable current threshold value Is, the inverter 110 is activated in free-wheeling mode. In a fourth time interval T4, the curve of the minimized phase currents lu, Iv, Iw is shown at a constant DC voltage Udc. Regardless of the rotational speed of the electrically energized machine, the phase currents lu, Iv, Iw no longer change, since in the meantime the excitation current or the excitation voltage of the electric machine is also reduced due to a control by means of the device 130. Thus, even when the rotor of the electric machine 190 is rotating, no substantial voltage is induced in the electric machine 190. Consequently, the inverter 110, the intermediate circuit capacitor 140 and the electric machine 190 are transferred into a safe state by means of the first sequence of steps.

Figure 3:
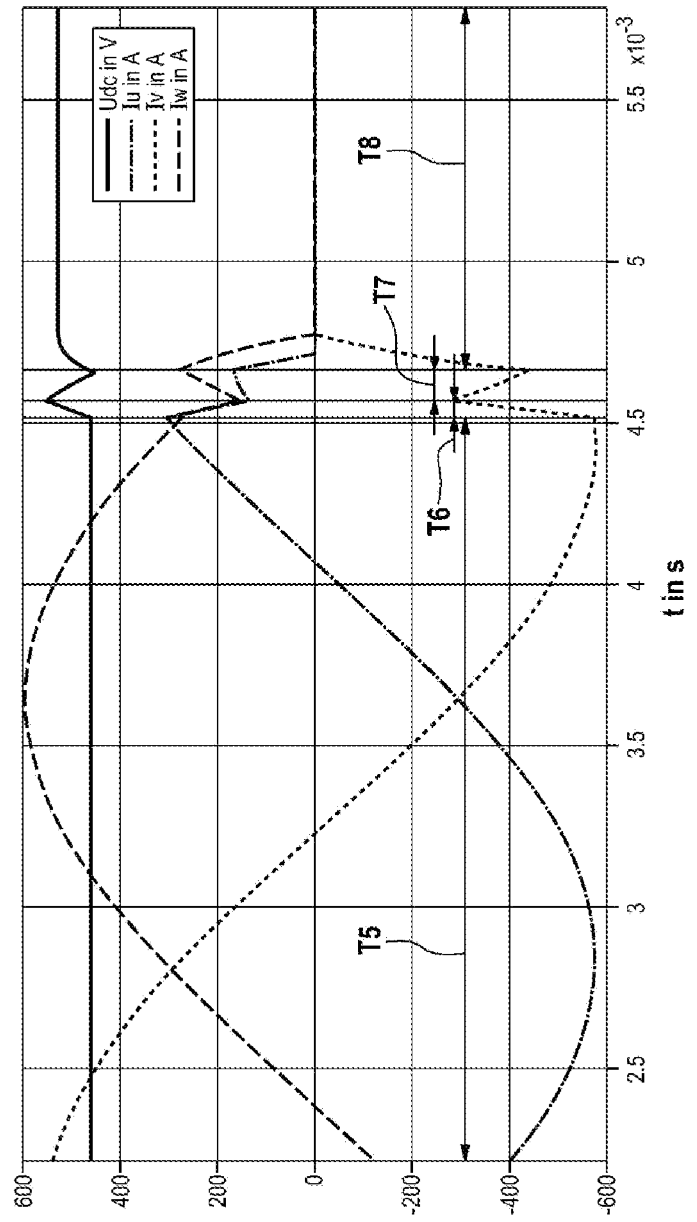
FIG. 3 a second schematic diagram of DC voltage and phase current

FIG. 3 shows a second schematic DC voltage, phase current diagram over time, which shows the curves of the DC voltage Udc at the intermediate circuit capacitor 140 and the phase currents lu, Iv, Iw on the output side of the inverter in the phases of the electrically energized machine if the inverter 110 is controlled by a device 130 for transferring the inverter 110, the intermediate circuit capacitor 140 and the electric machine 190 into a safe state by means of a second sequence of steps. During a fifth time interval T5 shown, the electric machine is operated in a second operating mode B2. In this operating mode B2, a constant DC voltage Udc is applied to the intermediate circuit capacitor 140. Sinusoidal phase currents lu, Iv, Iw, offset by 120°, flow through the phases of the electric machine. According to the exemplary representation, in order to determine the cut-off vector VA, the inverter 140 is briefly switched to free-wheeling FW in a sixth illustrated time interval T6. The DC voltage Udc at the intermediate circuit capacitor increases rapidly and strongly during this time. Preferably, the DC voltage Udc rises particularly sharply if the electrical connection between the intermediate circuit capacitor and the battery is disconnected or if there is a load shedding. Preferably, these are typical fault cases in the run-up to the implementation of the method for operating the inverter. After determining a negative vector VG, the inverter 110 is controlled in a seventh time interval T7 corresponding to the negative vector VG if the determined DC voltage Udc exceeds a predefinable voltage threshold value Us. The DC voltage Udc at the intermediate circuit capacitor drops rapidly during control by means of the negative vector VG. The phase currents lu, Iv, Iw are lower during this time interval than during regular operation and are therefore not critical. In an eighth time interval T8, the inverter 110 is controlled in free-wheeling mode FW as long as the determined DC voltage Udc falls below the predefinable voltage threshold value Us. In FIG. 3, the time intervals seven T7 and eight T8, in which the controlling of the inverter corresponding to the negative vector and the controlling of the inverter into free-wheeling mode takes place, are only drawn once. However, these two steps 437 and 438 occur depending on the determined DC voltage Udc and can therefore occur alternately several times until the DC voltage Udc permanently falls below the predefinable voltage threshold value Us. Consequently, the inverter 110, the intermediate circuit capacitor 140 and the electric machine 190 are transferred into a safe state by means of the second sequence of steps.

Figure 4:
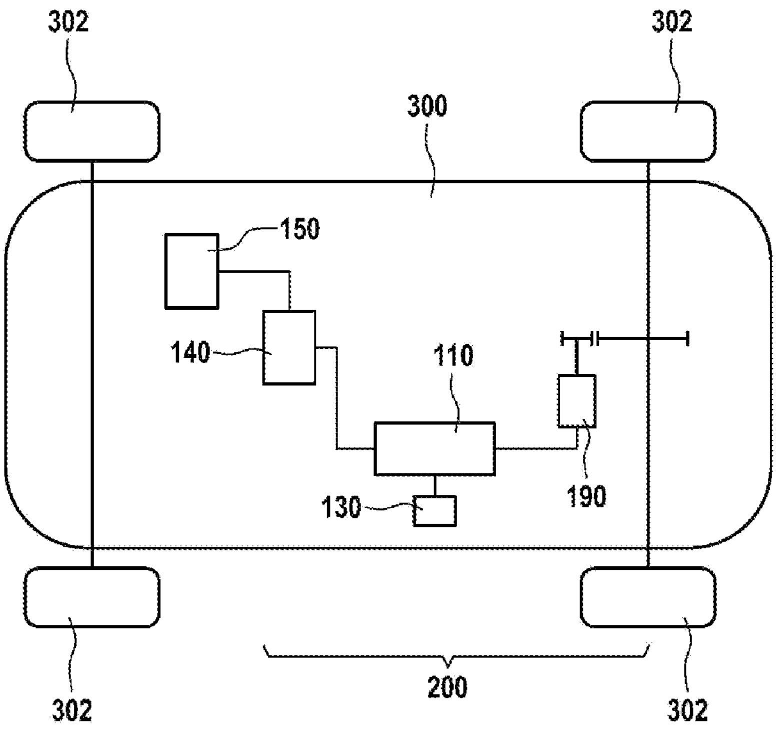
FIG. 4 a schematic illustration of a vehicle with a drive train.

FIG. 4 shows a schematic illustration of a vehicle 300 comprising a drive train 200. The representation shows an exemplary vehicle comprising four wheels 302, wherein the invention is equally applicable in any desired vehicle comprising any desired number of wheels on land, on water, and in the air. The electric drive train comprises the device 130 for operating the inverter 110. Preferably, the drive train 200 comprises an intermediate circuit capacitor 140, the inverter 110, an electrically energized machine 190 and/or a battery 150 for supplying the electric drive train with electrical power.

Figure 5:
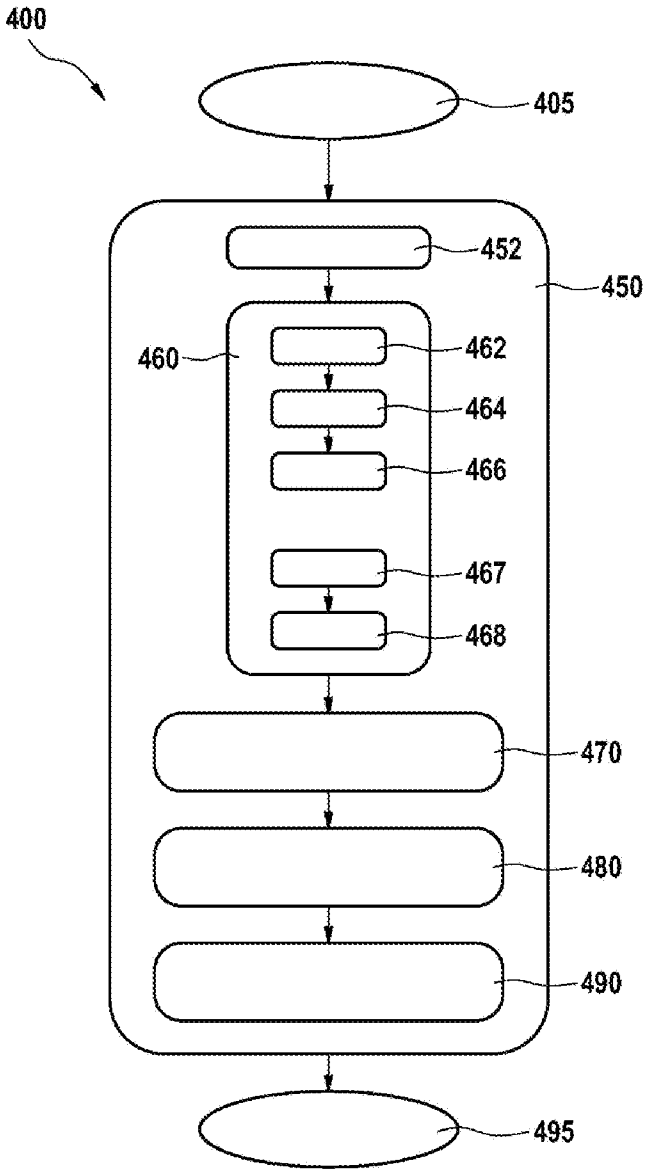
FIG. 5 a schematic illustration of a first flow chart for a method for operating an inverter FIG. 6 a schematic illustration of a second flow chart for a method for operating an inverter.

FIG. 5 shows a schematic illustration of a first flow chart for a method for operating an inverter. The inverter 110 is connected on the input side to an intermediate circuit capacitor 140 and on the output side to an electrically energized three-phase machine 190. The electric machine 190 is operated in a first operating mode B1, in particular in a generator-based mode, or in a second operating mode B2, in particular in a motor-based mode. The method 400 starts with step 405. In step 450, the inverter 110 is controlled for transferring the inverter 110, the intermediate circuit capacitor 140 and the electric machine 190 into a safe state, preferably controlled to a free-wheeling mode FW. Controlling the inverter for transferring is carried out by means of a first sequence of steps. In step 460 a cut-off vector is determined, in step 470 the inverter 110 is controlled according to the cut-off vector VA, in step 480 the three phase currents lu, Iv, Iw of the electric machine 190 are determined. In step 490, the inverter 110 is controlled in free-wheeling mode FW if the determined three phase currents lu, Iv, Iw fall below a predefinable current threshold value Is. The method ends at step 495. Preferably, the step 460 of determining the cut-off vector comprises a further three steps: Switching the inverter 110 to free-wheeling mode in step 462, determining a voltage vector in free-wheeling mode FW in step 464 and determining the cut-off vector VA depending on the voltage vector in step 466. Preferably, step 460, determining the cut-off vector, alternatively comprises further two steps: Periodically updating 467 the cut-off vector in a memory and reading 468 the cut-off vector from the memory in step 468. Preferably, the first sequence of steps comprises the step 452 of minimizing the excitation voltage of the electric machine 190.

Figure 6:
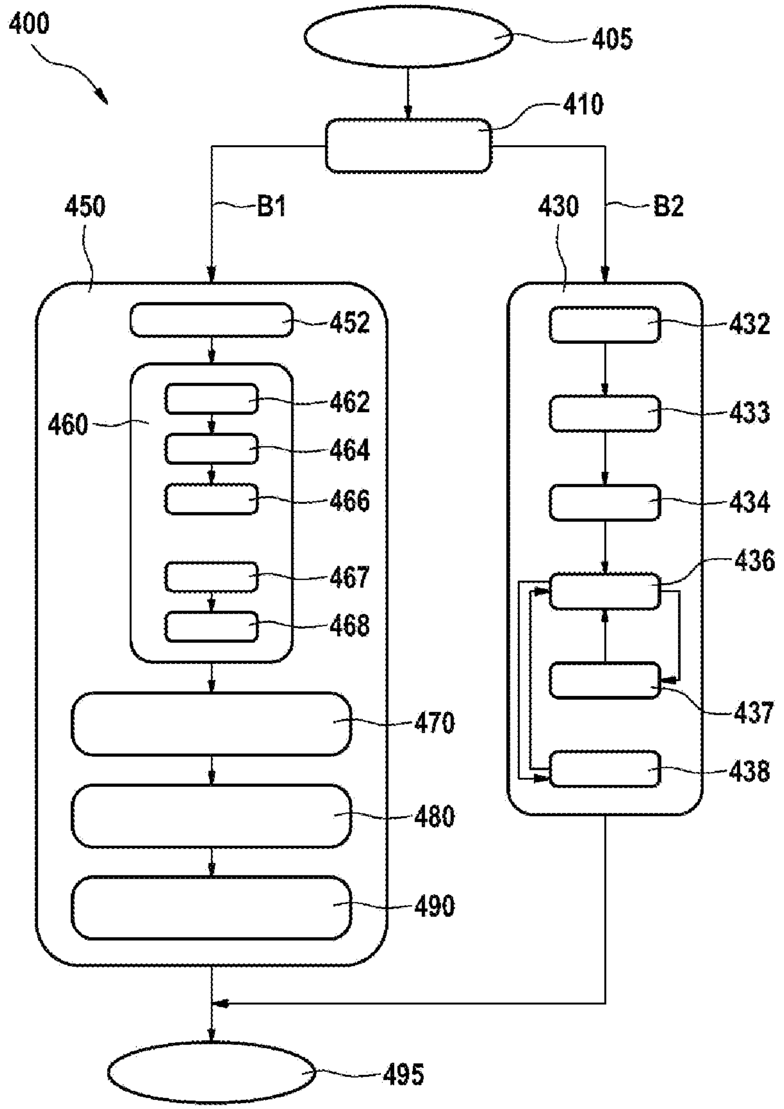

FIG. 6 shows a schematic illustration of a second flow chart for a method for operating an inverter. The method shown comprises the method already explained in FIG. 5. In addition, the method 400 initially comprises the step 410 of determining an operating mode B1, B2 of the electric machine. This is followed by controlling the inverter 110 for transferring depending on the determined operating mode by means of the first sequence of steps in step 450 when the first operating mode B1 is present and by means of a second sequence of steps in step 430 when the second operating mode B2 is present. The first sequence of steps is carried out as described in FIG. 6. In step 430, the inverter 110 is controlled for transferring the inverter 110, the intermediate circuit capacitor 140 and the electric machine 190 into a safe state, preferably controlled to a free-wheeling mode FW. Controlling the inverter for transferring is carried out by means of a second sequence of steps. The second sequence of steps comprises controlling the inverter 110 in free-wheeling mode FW in step 432, determining a voltage vector in free-wheeling mode FW in step 433, determining a negative vector depending on the voltage vector in step 434, determining an input-side DC voltage Udc of the inverter 110 in step 436, controlling the inverter 110 corresponding to the negative vector if the determined DC voltage Udc exceeds a predefinable voltage threshold value Us in step 437 and controlling 438 the inverter 110 in free-wheeling mode FW as long as the determined DC voltage Udc falls below the predefinable voltage threshold value Us in step 438.

The invention claimed is:

1. Method (400) for operating an inverter (110), wherein the inverter (110) is connected on an input side to an intermediate circuit capacitor (140) and is connected on an output side to an electrically energized three-phase machine (190), wherein the electric machine (190) is operated in a first operating mode (B1) or in a second operating mode (B2), the method comprising:

controlling (450) of the inverter (110) for transferring the inverter (110), the intermediate circuit capacitor (140) and the electric machine (190) into a free-wheeling mode (FW), wherein controlling (450) the inverter (110) for transferring is performed via a first sequence of steps, wherein the first sequence of steps comprises the steps of:

determining (460) a cut-off vector which is a voltage or current vector in which only one switch element on one half-bridge or one switch element on each of two half-bridges is closed and all remaining switch elements of the three half-bridges open, controlling (470) the inverter (110) corresponding to the cut-off vector, determining (480) three phase currents (lu, Iv, Iw) of the electric machine (190), and controlling (490) the inverter (110) to free-wheeling mode (FW) if the three phase currents (lu, Iv, Iw) determined fall below a predefinable current threshold (Is).

2. The method according to claim 1, wherein determining (460) the cut-off vector comprises:

controlling (462) the inverter (110) into free-wheeling mode (FW), determining (464) a voltage vector in free-wheeling mode (FW), and determining (466) the cut-off vector depending on the voltage vector.

3. The method according to claim 1, wherein determining (460) the cut-off vector comprises the steps of:

regularly updating (467) the cut-off vector in a memory depending on the operation of the inverter (110)-reading (468) the cut-off vector from the memory.

4. The method according to claim 1, wherein the inverter (110) comprises a first, second and third half-bridge (112, 114, 116) connected in parallel with the intermediate circuit capacitor (140), wherein each half-bridge (112, 114, 116) comprises two switch elements (112P, 112N, 114P, 114N, 116P, 116N) connected in series and a center tap between each of the two switch elements (112P, 112N, 114P, 114N, 116P, 116N) connected in series is connected to a respective phase connection of the electric machine (190), wherein the cut-off vector determined describes a closing of a first switch element (112P, 112N) of the first half-bridge (112) and an opening of a second switch element (112P, 112N) of the first half-bridge (112) and an opening of the two switch elements (114P, 114N, 116P, 116N) of the second and the third half-bridge (114, 116) or the cut-off vector determined describes a closing of a first switch element (112P, 112N) of the first half-bridge (112) and an opening of a second switch element (112P, 112N) of the first half-bridge (112) and a closing of a first switch element (114P, 114N) of the second half-bridge (114) and an opening of a second switch element (114P, 114N) of the second half-bridge (114) and the opening of the two switch elements (116P, 116N) of the third half-bridge (116).

5. The method according to claim 1, wherein controlling (450) the inverter (110) for transferring by means of a first sequence of steps comprises the step of:

minimizing (452) an excitation current of the electric machine (190).

6. The method (100) according to claim 1, wherein the method (100) starts with the steps of: determining (410) the operating mode (B1, B2) of the electric machine (190), and controlling the inverter (110) for transferring depending on the determined operating mode by means of the first sequence of steps (450) when the first operating mode (B1) is present and by means of a second sequence of steps (430) when the second operating mode (B2) is present.

7. The method of claim 6, wherein the second sequence of steps comprises the steps of:

controlling (432) the inverter (110) in free-wheeling mode (FW), determining (433) a voltage vector in free-wheeling mode (FW), determining (434) a negative vector depending on the voltage vector, determining (436) an DC voltage on the input side (Udc) of the inverter (110), controlling (437) of the inverter (110) corresponding to the negative vector if the determined DC voltage (Udc) exceeds a predefinable voltage threshold value, and controlling (438) of the inverter (110) in free-wheeling mode (FW) as long as the determined DC voltage (Udc) falls below the voltage threshold value.

8. A device (130) for operating an inverter (110), wherein the inverter (110) is configured to be connected on an input side to an intermediate circuit capacitor (140) and on an output side to an electrically energized three-phase machine (190), wherein the electric machine (190) is configured to be operated in a first operating mode (B1), or in a second operating mode (B2), wherein the device (130) is configured to control the inverter (110) for transferring the inverter (110), the intermediate circuit capacitor (140) and the electric machine (190) into a free-wheeling mode (FW), wherein the device (130) is configured to perform the controlling (450) of the inverter for transferring by means of a first sequence of steps, wherein the first sequence of steps comprises:

determining a cut-off vector (460) which is a voltage or current vector in which only one switch element on one half-bridge or one switch element on each of two half-bridges is closed and all remaining switch elements of the three half-bridges open, controlling (470) the inverter (110) corresponding to the cut-off vector, determining three phase currents (lu, Iv, Iw) of the electric machine (190), switching the inverter (110) to free-wheeling mode (FW) if the determined three phase currents (lu, Iv, Iw) fall below a predefinable current threshold value (Is).

9. A drive train (200) comprising a device (130) for operating an inverter (110), wherein the inverter (110) is configured to be connected on an input side to an intermediate circuit capacitor (140) and on an output side to an electrically energized three-phase machine (190), wherein the electric machine (190) is configured to be operated in a first operating mode (B1), or in a second operating mode (B2), wherein the device (130) is configured to control the inverter (110) for transferring the inverter (110), the intermediate circuit capacitor (140) and the electric machine (190) into a free-wheeling mode (FW), wherein the device (130) is configured to perform the controlling (450) of the inverter for transferring by means of a first sequence of steps, wherein the first sequence of steps comprises:

determining a cut-off vector (460) which is a voltage or current vector in which only one switch element on one half-bridge or one switch element on each of two half-bridges is closed and all remaining switch elements of the three half-bridges open, controlling (470) the inverter (110) corresponding to the cut-off vector, determining three phase currents (lu, Iv, Iw) of the electric machine (190), switching the inverter (110) to free-wheeling mode (FW) if the determined three phase currents (lu, Iv, Iw) fall below a predefinable current threshold value (Is).

10. A vehicle (300) comprising a drive train (200) according to claim 9.

11. A non-transitory, computer-readable storage medium comprising commands which, when executed by a computer, cause the computer to operate an inverter (110), wherein the inverter (110) is connected on an input side to an intermediate circuit capacitor (140) and is connected on an output side to an electrically energized three-phase machine (190), wherein the electric machine (190) is operated in a first operating mode (B1) or in a second operating mode (B2), by:

controlling (450) of the inverter (110) for transferring the inverter (110), the intermediate circuit capacitor (140) and the electric machine (190) into a free-wheeling mode (FW), wherein controlling (450) the inverter (110) for transferring is performed via a first sequence of steps, wherein the first sequence of steps comprises the steps of:

determining (460) a cut-off vector which is a voltage or current vector in which only one switch element on one half-bridge or one switch element on each of two half-bridges is closed and all remaining switch elements of the three half-bridges open, controlling (470) the inverter (110) corresponding to the cut-off vector, determining (480) three phase currents (lu, Iv, Iw) of the electric machine (190), and controlling (490) the inverter (110) to free-wheeling mode (FW) if the three phase currents (lu, Iv, Iw) determined fall below a predefinable current threshold (Is).

* * * * *